United States Patent
Su et al.

(10) Patent No.: US 8,930,004 B2
(45) Date of Patent: Jan. 6, 2015

(54) ELECTRONIC DEVICE AND FAN CONTROL METHOD

(75) Inventors: Chien-Ming Su, Taipei (TW); Min-Yuan Lin, Taipei (TW); Hsiang-Tien Wu, Taipei (TW); Zuo-Yu Huang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 483 days.

(21) Appl. No.: 13/150,276

(22) Filed: Jun. 1, 2011

(65) Prior Publication Data

US 2012/0253490 A1    Oct. 4, 2012

(30) Foreign Application Priority Data

Mar. 30, 2011  (TW) .............................. 100111068 A

(51) Int. Cl.
*G06F 17/00*   (2006.01)
*H03G 3/20*    (2006.01)
*G05D 23/19*   (2006.01)

(52) U.S. Cl.
CPC ..................................... *G05D 23/19* (2013.01)
USPC .............................................. 700/94; 381/57

(58) Field of Classification Search
CPC ........ G05D 23/19; H03G 3/24; F04D 25/062; F04D 29/0513; F04D 29/30; G06F 1/203; F16C 17/107
USPC ................ 700/94, 300; 415/174.1; 340/500; 381/397, 56–59
See application file for complete search history.

(56) References Cited

U.S. PATENT DOCUMENTS

| | | | |
|---|---|---|---|
| 2007/0139558 A1* | 6/2007 | Reineke | 348/571 |
| 2008/0312914 A1 | 12/2008 | Rajendran et al. | |
| 2009/0006901 A1* | 1/2009 | Brey et al. | 714/47 |
| 2009/0125159 A1* | 5/2009 | Shen et al. | 700/300 |
| 2009/0222147 A1* | 9/2009 | Nakashima et al. | 700/300 |
| 2009/0259348 A1* | 10/2009 | Syu | 700/300 |
| 2010/0002890 A1* | 1/2010 | Lyon et al. | 381/71.5 |
| 2010/0169531 A1* | 7/2010 | Bae | 710/303 |
| 2012/0224951 A1* | 9/2012 | Degner et al. | 415/174.1 |

FOREIGN PATENT DOCUMENTS

| | | |
|---|---|---|
| JP | 11-184566 | 7/1999 |
| JP | 2003-148144 | 5/2003 |
| TW | 591362 | 6/2004 |

OTHER PUBLICATIONS

"Office Action of Taiwan Counterpart Application", issued on Jul. 30, 2014, p. 1-p. 8.

* cited by examiner

*Primary Examiner* — Fan Tsang
*Assistant Examiner* — Eugene Zhao
(74) *Attorney, Agent, or Firm* — Jianq Chyun IP Office

(57) ABSTRACT

An electronic device including an audio module, a monitoring module and a fan is provided. The audio module generates an audio signal and an audio parameter according to audio data, and transmits the audio signal to a play device. Furthermore, the monitoring module determines a speed of fan rotation base on the type of the play device, the audio parameter and a sensed temperature. Then, a rotation speed of the fan is adjusted according to the determined speed of fan rotation.

20 Claims, 5 Drawing Sheets

ELECTRONIC DEVICE AND FAN CONTROL METHOD

CROSS-REFERENCE TO RELATED APPLICATION

This application claims the priority benefit of Taiwan application serial no. 100111068, filed on Mar. 30, 2011. The entirety of the above-mentioned patent application is hereby incorporated by reference herein and made a part of this specification.

BACKGROUND

1. Field of the Invention

The invention relates to an electronic device and a fan control method. Particularly, the invention relates to an electronic device using one of a first temperature-controlled rotation speed table and a second temperature-controlled rotation speed table to adjust a fan rotation speed, and a fan control method thereof.

2. Description of Related Art

With development of technology, computer systems have become one of most important hardware bases of the modern information society. Moreover, a computation speed of the computer system is continuously enhanced to deal with a huge amount of data required to be processed and shorten a data processing time. However, as the computation speed of the computer system is enhanced, heat generated by various circuits (especially a central processing unit (CPU) in the computer system becomes higher. Therefore, to ensure a stable and continuous operation of the computer system, a fan has to be installed in the computer system to control a system temperature within a safe range.

According to an existing fan control method, a fan rotation speed is generally controlled according to the system temperature. However, when the system temperature is not changed, the existing fan control method cannot control the fan rotation speed according to a variation of surrounding environment of the computer system. For example, young people often spend a long time to play computer games, and noisy game music is output by a speaker during the game playing process. However, according to the existing fan control method, the fan rotation speed is adjusted only when the system temperature of the computer system is increased to a threshold. If the computer system can suitably adjust the fan rotation speed at an initial stage when the speaker plays the music, it avails improving system performance and preventing system overheat in advance.

SUMMARY OF THE INVENTION

The invention is directed to an electronic device, in which one of a first temperature-controlled rotation speed table and a second temperature-controlled rotation speed table is selected to control a rotation speed of a fan according to a type of a play device and an audio parameter. In this way, when a sound sent by the electronic device overshadows a fan noise, the rotation speed of the fan is enhanced, so as to improve the operating performance of the electronic device.

The invention is directed to a fan control method, by which one of a first temperature-controlled rotation speed table and a second temperature-controlled rotation speed table is selected to control a rotation speed of a fan according to a type of a play device and an audio parameter, so as to improve the operating performance of the electronic device.

The invention provides an electronic device including an audio module, a monitoring module and a fan. The audio module generates an audio signal and an audio parameter according to audio data, and transmits the audio signal to a play device. Furthermore, the monitoring module determines a speed of fan rotation according to the type of the play device, the audio parameter and a sensed temperature. Then, a rotation speed of the fan is adjusted according to the determined speed of fan rotation.

In an embodiment of the invention, the audio module includes an audio codec. The audio codec converts the audio data into the audio signal according to a gain value, and transmits the audio signal to the play device. Moreover, the audio codec generates the audio parameter according to the gain value and an amplitude value of the audio data, or generates the audio parameter according to an internal current.

In an embodiment of the invention, the monitoring module uses a first temperature-controlled rotation speed table or a second temperature-controlled rotation speed table to generate the speed of fan rotation.

In an embodiment of the invention, the monitoring module includes a control chip, a codec driver and an embedded controller. The control chip captures the audio parameter. The codec driver determines whether the audio parameter is greater than a threshold value, so as to determine whether or not to generate a switching signal. The embedded controller determines whether the play device is an inbuilt speaker and determines whether the switching signal lasts for a predetermined time. When the play device is not the inbuilt speaker or the switching signal does not last for the predetermined time, the embedded controller uses the first temperature-controlled rotation speed table to generate the speed of fan rotation. Moreover, when the play device is the inbuilt speaker and the switching signal lasts for the predetermined time, the embedded controller uses the second temperature-controlled rotation speed table to generate the speed of fan rotation.

In an embodiment of the invention, the monitoring module includes a current sensor and an embedded controller. The current sensor detects the audio parameter. The embedded controller determines whether the play device is an inbuilt speaker and determines whether the audio parameter is greater than a threshold value for a predetermined time. When the play device is not the inbuilt speaker or the audio parameter is not greater than the threshold value for the predetermined time, the embedded controller uses the first temperature-controlled rotation speed table to generate the speed of fan rotation. Moreover, when the play device is the inbuilt speaker and the audio parameter is greater than the threshold value for the predetermined time, the embedded controller uses the second temperature-controlled rotation speed table to generate the speed of fan rotation.

The invention provides a fan control method, which is adapted to an electronic device including a fan and a play device. The fan control method includes following steps. An audio signal and an audio parameter are generated according to audio data. The audio signal is transmitted to a play device. A speed of fan rotation is determined according to the type of the play device, the audio parameter and a sensed temperature. A rotation speed of the fan is adjusted according to the determined speed of fan rotation.

According to the above descriptions, in the invention, one of the first temperature-controlled rotation speed table and the second temperature-controlled rotation speed table is selected to control the rotation speed of the fan according to the type of the play device and the audio parameter. In this way, when the sound sent by the electronic device conceals the noise of the fan, the rotation speed of the fan is enhanced, so as to improve the operating performance of the electronic device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
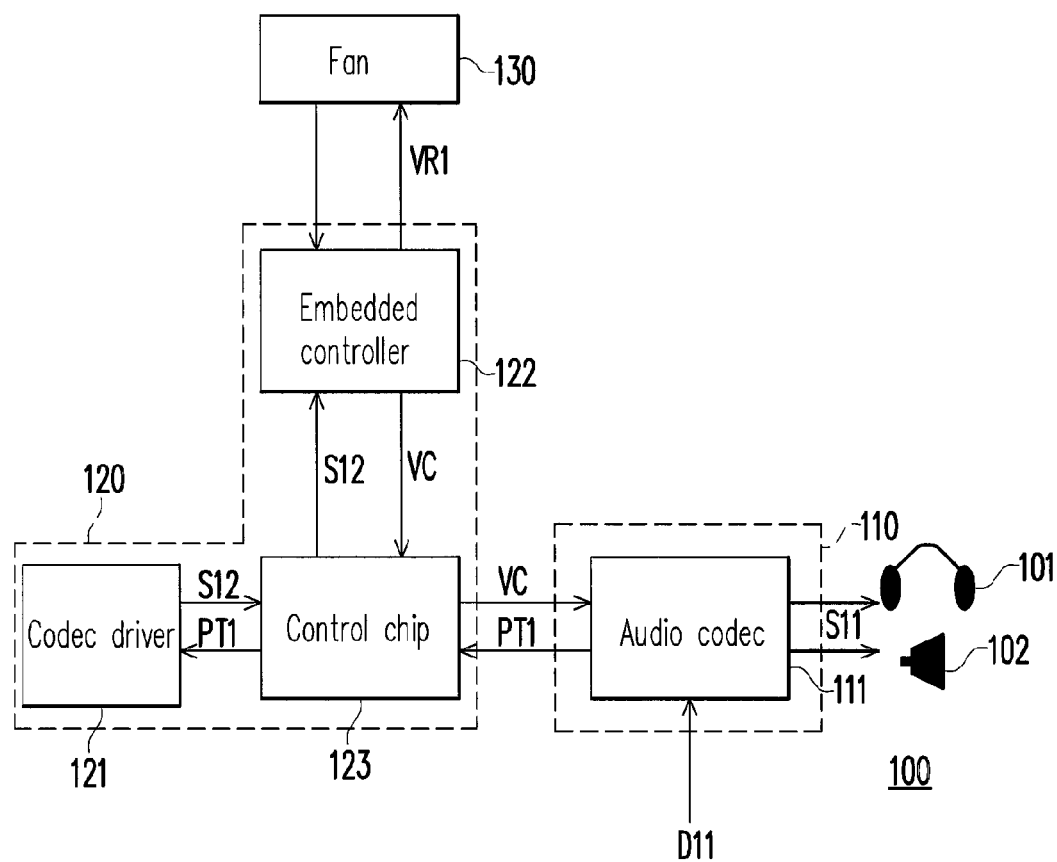
FIG. 1 is a block schematic diagram of an electronic device according to an embodiment of the invention.

FIG. 1 is a block schematic diagram of an electronic device according to an embodiment of the invention. Referring to FIG. 1, the electronic device 100 includes an audio module 110, a monitoring module 120 and a fan 130. The audio module 110 is electrically connected to a play device, for example, an earphone 101 or an inbuilt speaker 102. Moreover, the monitoring module 120 is electrically connected to the audio module 110 and the fan 130.

In operation, the audio module 110 generates an audio signal S11 and an audio parameter PT1 according to audio data D11. Moreover, the audio module 110 transmits the audio signal S11 to the play device, and the play device accordingly produces a corresponding sound. On the other hand, the monitoring module 120 determines to use a first temperature-controlled rotation speed table or a second temperature-controlled rotation speed table to generate a speed VR1 of fan rotation according to a type of the play device and the audio parameter PT1. In this way, the fan 130 adjusts a rotation speed thereof according to the speed VR1 of fan rotation.

In other words, the monitoring module 120 selects one of the first temperature-controlled rotation speed table and the second temperature-controlled rotation speed table for utilization according to the type of the play device and the audio parameter PT1. Moreover, under the same temperature, a predetermined rotation speed in the first temperature-controlled rotation speed table is smaller than a predetermined rotation speed in the second temperature-controlled rotation speed table. Therefore, when a sound sent by the electronic device 100 is large enough to conceal the noise generated by the fan 130, the monitoring module 120 uses the second temperature-controlled rotation speed table to accelerate the rotation speed of the fan 130, so as to strengthen a heat dissipation mechanism of the electronic device 100. In this way, the operation performance of the electronic device 100 can be improved. Conversely, when the sound sent by the electronic device 100 is small, the monitoring module 120 uses the first temperature-controlled rotation speed table to control the rotation speed of the fan 130, so as to maintain the operation performance of the electronic device 100.

Figure 2:
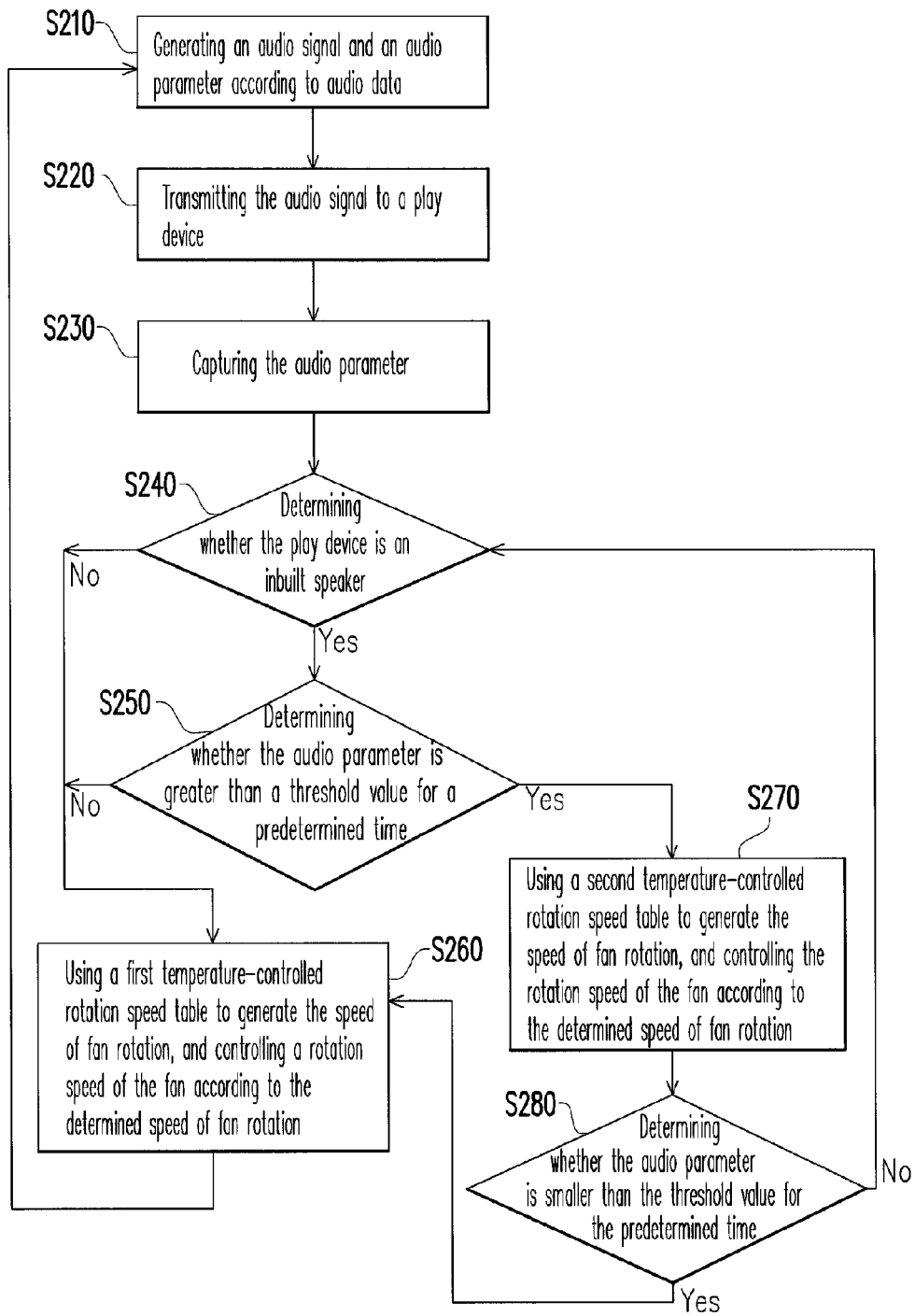
FIG. 2 is a flowchart illustrating a fan control method according to an embodiment of the invention.

FIG. 2 is a flowchart illustrating a fan control method according to an embodiment of the invention. In order to fully convey the spirit of the invention to those skilled in the art, detailed operations of the components of the electronic device 100 are described below with reference of FIG. 1 and FIG. 2.

The audio module 110 includes an audio codec 111. The monitoring module 120 includes a codec driver 121, an embedded controller 122 and a control chip 123. The control chip 123 is, for example, a platform controller hub (PCH). The audio codec 111 is electrically connected to the play device and the control chip 123. The embedded controller 122 is electrically connected to the fan 130 and the control chip 123, and the codec driver 121 is electrically connected to the control chip 123.

In operation, the audio codec 111 receives the digital audio data D11, where a format of the audio data D11 is, for example, a pulse coding modulation (PCM) format. In step S210, the audio codec 111 decodes the audio data D11, and converts the decoded audio data D11 into the analog audio signal S11. Moreover, during a process of generating the audio signal S11, the audio codec 111 adjusts a magnitude of the audio signal S11 according to a gain value, so as to adjust a volume. Moreover, the audio codec 111 further generates the audio parameter PT1 according to the gain value and an amplitude value of the audio data D11.

In addition, in step S220, the audio codec 111 transmits the audio signal S11 to the play device, for example, the earphone 101 or the inbuilt speaker 102. The audio codec 111 can automatically transmit the audio signal S11 to the play device, or transmits the audio signal S11 to the play device under the control of the control chip 123. Although different methods for transmitting the audio signal S11 to the play device are described above, the invention is not limited thereto. On the other hand, in view of volume adjustment, the audio codec 111 sets a volume of the play device according to a volume predetermined value preset in the audio codec 111 at the beginning. Moreover, when the user wants to adjust the volume of the play device, the user can press an external button or turn a knob to generate a corresponding control signal, and the embedded controller 122 transmits another volume predetermined value VC to the control chip 123. Then, the control chip 123 replaces the volume predetermined value preset in the audio codec 111 with the volume predetermined value VC, so as to adjust the volume of the play device.

Figure 3:
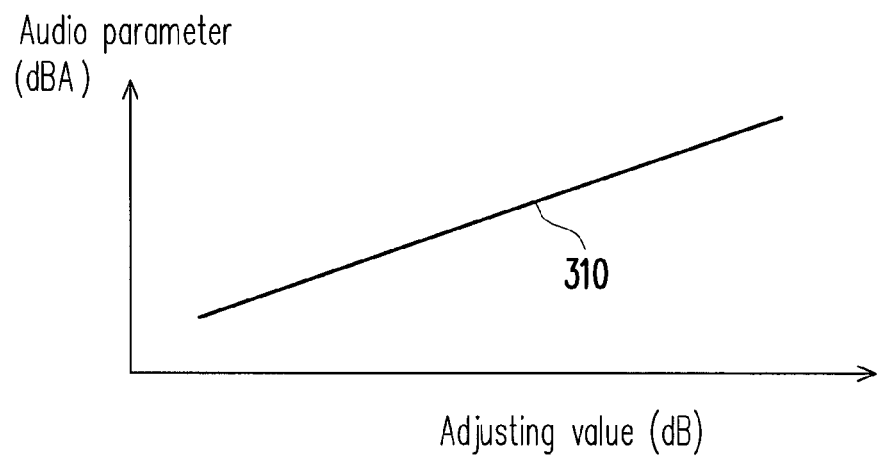
FIG. 3 is a schematic diagram of a conversion curve according to an embodiment of the invention.

On the other hand, in step S230, the control chip 123 captures the audio parameter PT1, and transmits the audio parameter PT1 to the codec driver 121. Moreover, the codec driver 121 determines whether the audio parameter PT1 is greater than a threshold value, so as to determine whether or not to generate a switching signal S12, wherein a unit of the threshold value is decibel (dB), and the threshold value is pre-stored in the codec driver 121. The threshold value is obtained as follows. As shown in FIG. 3, a conversion curve 310 is obtained according to experiments, and a horizontal axis of the conversion curve 310 represents adjusting values, and a vertical axis of the conversion curve 310 represents sound pressure levels, and the "adjusting value" is obtained by adding the gain value and the amplitude value of the audio data. In an actual application, a sound pressure level is selected, and the selected sound pressure level is converted into a corresponding adjusting value through the conversion curve 310, and the adjusting value is set as the threshold value stored in the codec driver 121.

Moreover, in step S240, the embedded controller 122 determines whether the play device is the inbuilt speaker 102, so as to determine whether the electronic device 100 is capable of sending a sound. For example, when the play device is not the inbuilt speaker 102, the play device can be the earphone 101 or an external speaker, and thereby the electronic device 100 cannot send sounds to conceal the noise generated by the fan 130. Conversely, when the play device is the inbuilt speaker 102, it represents that the electronic device 100 can send sounds itself. Therefore, the electronic device 100 can send sounds to conceal the noise generated by the fan 130.

Moreover, in step S250, the codec driver 121 determines whether the audio parameter PT1 is greater than a threshold value, so as to determine whether or not to generate a switching signal. The threshold value is, for example, −24.6 dB. When the audio parameter PT1 is greater than the threshold value, the codec driver 121 generates the switching signal S12. Conversely, when the audio parameter PT1 is not greater than the threshold value, the codec driver 121 does not generate the switching signal S12. Moreover, the control chip 123 transmits the switching signal S12 to the embedded controller 122. In addition, the embedded controller 122 determines whether the play device is an inbuilt speaker, and determines whether the switching signal S12 lasts for a predetermined time.

Since generation of the switching signal S12 relates to the audio parameter PT1, the embedded controller 122 determines whether the audio parameter PT1 is greater than the threshold value for a predetermined time according to whether the switching signal S12 lasts for the predetermined time. On the other hand, in determination of whether the switching signal S12 lasts for the predetermined time, when the audio parameter PT1 is greater than the threshold value, the codec driver 121 immediately transmits the switching signal S12 to the embedded controller 122 through the control chip 123. Since a timer is built in the embedded controller 122, and the timer can be triggered by the switching signal S12 to start timing, the embedded controller 122 can determine whether the switching signal S12 lasts for the predetermined time according to a timing result of the timer.

In the present embodiment, although the timer in the embedded controller 122 is used to determine whether the audio parameter PT1 is greater than the threshold value for the predetermined time, if the codec driver 121 has a timer, the codec driver 121 can directly use the internal timer to determine whether the audio parameter PT1 is greater than the threshold value for the predetermined time, and generates the switching signal S12 according to a determination result. As such, the embedded controller 122 can directly determine whether the audio parameter PT1 is greater than the threshold value for the predetermined time according to the switching signal S12.

Moreover, when the play device is not the inbuilt speaker 102 or the switching signal S12 does not last for the predetermined time, i.e. when the play device is not the inbuilt speaker 102 or the audio parameter PT1 is not greater than the threshold value for the predetermined time, a step S260 is executed. In step S260, the embedded controller 122 uses the first temperature-controlled rotation speed table to generate the speed VR1 of fan rotation, and controls the rotation speed of the fan 130 base on the speed VR1 of fan rotation. For example, as shown in a table one, a memory unit (not shown) of the embedded controller 122 stores the first temperature-controlled rotation speed table. The first temperature-controlled rotation speed table records corresponding relationships of temperatures and predetermined rotation speeds.

Therefore, when the embedded controller 122 uses the first temperature-controlled rotation speed table to generate the speed of fan rotation VR1, the embedded controller 122 looks up the first temperature-controlled rotation speed table according to a sensed temperature, and generates the corresponding speed VR1 of fan rotation according to a look-up result. The sensed temperature is, for example, the temperature of an electronic component (e.g. CPU) in the electronic device or the temperature of environment (e.g. the internal or external temperature of the electronic device), and is generated by a temperature sensor (not shown) in the electronic device 100. For example, when the sensed temperature falls in a temperature range of 45° C.-55° C., the embedded controller 122 generates the corresponding speed VR1 of fan rotation to adjust the rotation speed of the fan 130 to 3100 RPM. Conversely, when the sensed temperature falls in a temperature range of 65° C.-75° C., the rotation speed of the fan 130 is then adjusted to 3800 RPM.

TABLE ONE

| first temperature-controlled rotation speed table ||
| Temperature (° C.) | Predetermined rotation speed (RPM) |
|---|---|
| 40~45 | 2700 |
| 45~55 | 3100 |
| 55~65 | 3400 |
| 65~75 | 3800 |
| 75~85 | 4100 |

In addition, when the play device is the inbuilt speaker 102 and the switching signal lasts for the predetermined time, i.e. when the play device is the inbuilt speaker 102 and the audio parameter PT1 is greater than the threshold value for the predetermined time, a step S270 is executed. In step S270, the embedded controller 122 uses the second temperature-controlled rotation speed table to generate the speed VR1 of fan rotation, and controls the rotation speed of the fan 130 base on the speed VR1 of fan rotation. For example, as shown in a table two, the memory unit of the embedded controller 122 further stores the second temperature-controlled rotation speed table. The second temperature-controlled rotation speed table records corresponding relationships of temperatures and predetermined rotation speeds.

Therefore, when the embedded controller 122 uses the second temperature-controlled rotation speed table to generate the speed of fan rotation VR1, the embedded controller 122 looks up the second temperature-controlled rotation speed table according to a sensed temperature, and generates the corresponding speed of fan rotation VR1 according to a look-up result. For example, when the sensed temperature falls in a temperature range of 45° C.-55° C., the embedded controller 122 generates the corresponding speed of fan rotation VR1 to adjust the rotation speed of the fan 130 to 3300 RPM. Conversely, when the sensed temperature falls in a temperature range of 65° C.-75° C., the rotation speed of the fan 130 is then adjusted to 4000 RPM.

TABLE TWO

| second temperature-controlled rotation speed table ||
| Temperature (° C.) | Predetermined rotation speed (RPM) |
|---|---|
| 40~45 | 2900 |
| 45~55 | 3300 |

TABLE TWO-continued second temperature-controlled rotation speed table

| Temperature (° C.) | Predetermined rotation speed (RPM) |
|---|---|
| 55~65 | 3600 |
| 65~75 | 4000 |
| 75~85 | 5000 |

Moreover, during a process of using the second temperature-controlled rotation speed table to control the fan 130, in step S280, the embedded controller 122 determines whether the audio parameter PT1 is smaller than the threshold value for the predetermined time according to the switching signal S12. In this way, when the audio parameter PT1 is not smaller than the threshold value for the predetermined time, it indicates that the play device continually plays sounds, and now next step is returning to the step S240 to determine whether the electronic device 100 is capable of continually sending sounds according to the type of the play device. Conversely, when the audio parameter PT1 is smaller than the threshold value for the predetermined time, it indicates that the play device stops playing sounds, so that next step is to return to the step S260 to use the first temperature-controlled rotation speed table to generate the speed VR1 of fan rotation.

It should be noticed that in the same temperature range, the predetermined rotation speed recorded by the second temperature-controlled rotation speed table is greater than the predetermined rotation speed recorded by the first temperature-controlled rotation speed table. For example, in a temperature range of 75° C.-85° C., the predetermined rotation speed recorded by the second temperature-controlled rotation speed table is 5000 RPM, and the predetermined rotation speed recorded by the first temperature-controlled rotation speed table is 4100 RPM. Therefore, when the monitoring module 120 uses the second temperature-controlled rotation speed table to control the fan 130, the rotation speed of the fan 130 can be relatively increased. Moreover, as the rotation speed of the fan 130 is increased, the noise generated by the fan 130 is also increased. For example, when the rotation speed of the fan 130 is respectively 5000 RPM and 4100 RPM, the sound pressure levels thereof are respectively 48 dBA and 42 dBA. However, since the electronic device 100 uses the second temperature-controlled rotation speed table to control the fan 130 under a condition that the electronic device 100 itself can send sounds, even if the noise of the fan 130 is increased, it can still be concealed by the sounds sent by the electronic device 100.

Figure 4:
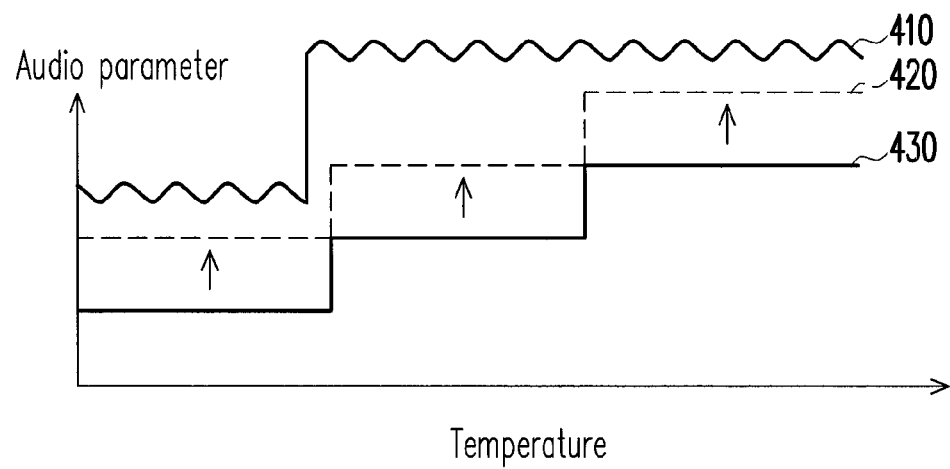
FIG. 4 is a curve diagram of fan rotation speeds and sound pressure levels varied along with temperatures according to an embodiment of the invention.

For example, FIG. 4 is a curve diagram of the sound pressure levels varied along with temperatures according to an embodiment of the invention. A curve 410 represents sound pressure levels generated by the inbuilt speaker 102, a curve 420 represents sound pressure levels generated by the fan 130 under the control of the second temperature-controlled rotation speed table, and a curve 430 represents sound pressure levels generated by the fan 130 under control of the first temperature-controlled rotation speed table. As shown in FIG. 4, as the sound pressure level varies along with the curve 410, the audio codec 111 generates different audio parameters PT1, so that the embedded controller 122 may use different temperature-controlled rotation speed tables to control the rotation speed of the fan 130. Moreover, in the same temperature range, the predetermined rotation speed recorded by the second temperature-controlled rotation speed table is greater than the predetermined rotation speed recorded by the first temperature-controlled rotation speed table. Therefore, shown by the curve 420 and the curve 430, in the same temperature range, the fan 130 has different rotation speeds in response to different temperature-controlled rotation speed tables, and accordingly generates different sound pressure levels.

Moreover, in an actual application, those skilled in the art can also integrate the table one and the table two to a same temperature-controlled rotation speed table. For example, a table three is a table obtained after integrating the table one and the table two. Now, the embedded controller 122 can directly use the temperature-controlled rotation speed table of the table three to generate the speed VR1 of fan rotation. The embedded controller 122 can select a specific field according to the type of the play device and the audio parameter PT1, and obtains the predetermined rotation speed from the specific field according to the sensed temperature.

TABLE THREE

| Temperature (° C.) | Audio parameter smaller than threshold value | Audio parameter greater than threshold value |
|---|---|---|
| 40~45 | 2700 (RPM) | 2900 (RPM) |
| 45~55 | 3100 (RPM) | 3300 (RPM) |
| 55~65 | 3400 (RPM) | 3600 (RPM) |
| 65~75 | 3800 (RPM) | 4000 (RPM) |
| 75~85 | 4100 (RPM) | 5000 (RPM) |

Figure 5:
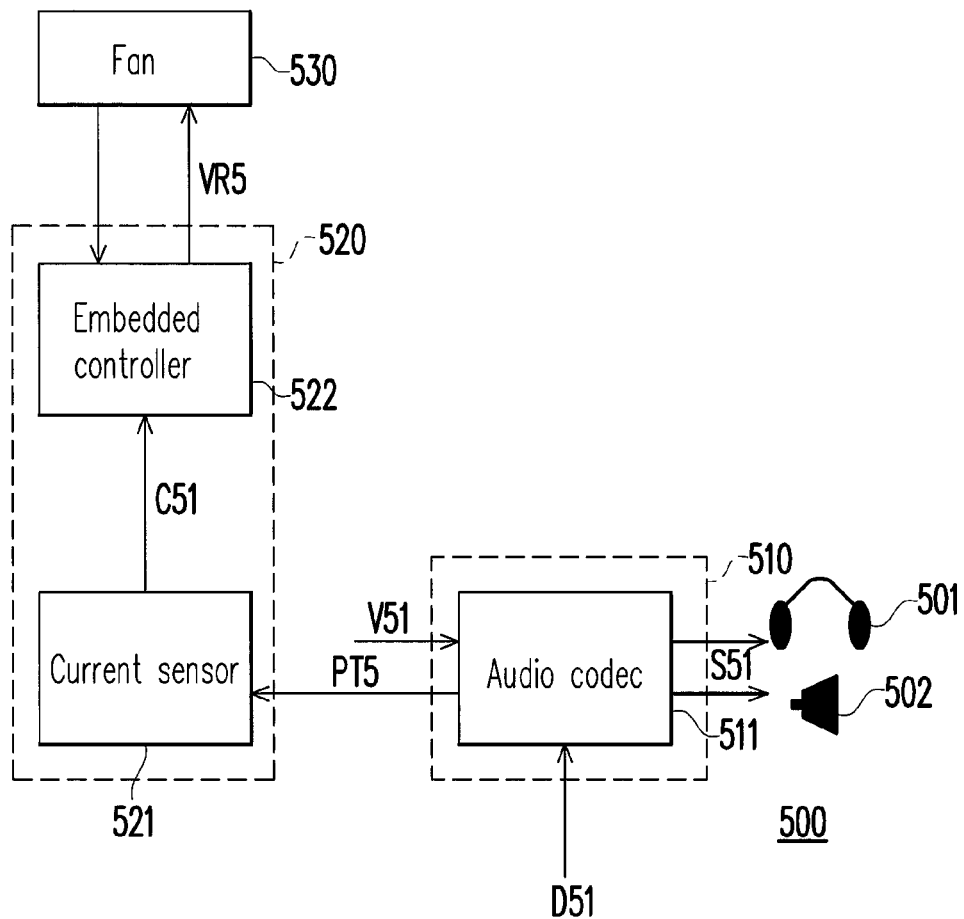
FIG. 5 is a block schematic diagram of an electronic device according to another embodiment of the invention.

FIG. 5 is a block schematic diagram of an electronic device according to another embodiment of the invention. Referring to FIG. 5, the electronic device 500 includes an audio module 510, a monitoring module 520 and a fan 530. The audio module 510 is electrically connected to a play device, for example, an earphone 501 or an inbuilt speaker 502. In operation, the audio module 510 generates an audio signal S51 and an audio parameter PT5 according to audio data D51. Moreover, the audio module 510 transmits the audio signal S51 to the play device, and the play device produces corresponding sounds. On the other hand, the monitoring module 520 determines to use the first temperature-controlled rotation speed table or the second temperature-controlled rotation speed table to generate a speed VR5 of fan rotation according to the type of the play device and the audio parameter PT5. In this way, the rotation speed of the fan 530 can be adjusted according to the speed VR5 of fan rotation.

Figure 6:
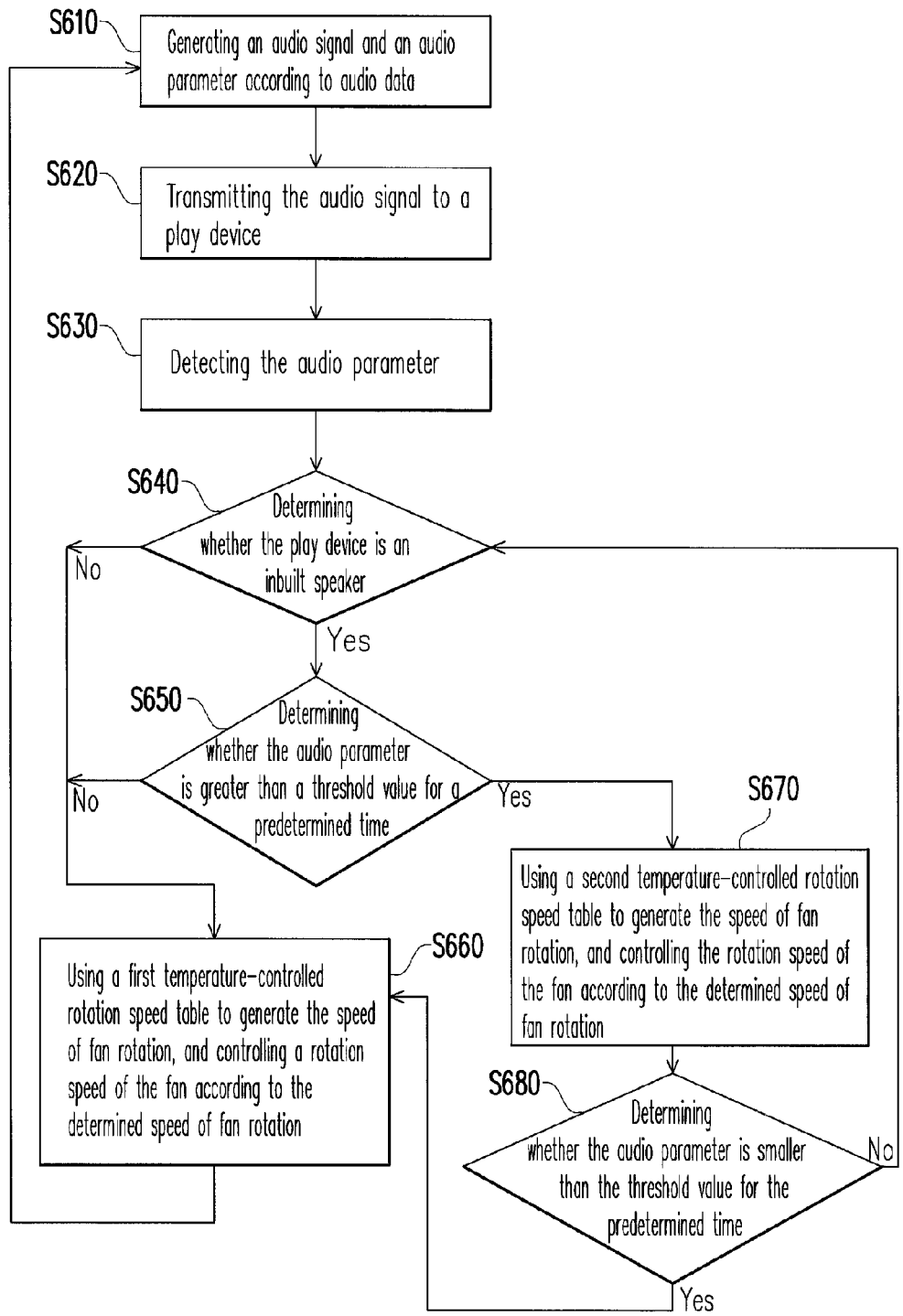
FIG. 6 is a flowchart illustrating a fan control method according to another embodiment of the invention.

FIG. 6 is a flowchart illustrating a fan control method according to another embodiment of the invention. In order to fully convey the spirit of the invention to those skilled in the art, detailed operations of the components of the electronic device 500 are described with reference of FIG. 5 and FIG. 6. Here, the audio module 510 includes an audio codec 511. The monitoring module 520 includes a current sensor 521 and an embedded controller 522. The audio codec 511 is electrically the play device and the current sensor 521. Moreover, the embedded controller 522 is electrically connected to the current sensor 521 and the fan 530.

In operation, the audio codec 511 receives the digital audio data D51, wherein a format of the audio data D51 is, for example, a PCM format. In step S610, the audio codec 511 converts the audio data D51 into the audio signal S51 with reference of a gain value. Moreover, the audio codec 511 requires different powers according to different music playing volumes, so that the power supply may provide a voltage V51 of different levels to the audio codec 511. In addition, as the level of the voltage V51 varies, an internal current of the audio codec 51 is correspondingly varied, and the audio codec 511 accordingly generates the audio parameter PT5 related to the internal current. Moreover, in step S620, the audio codec 511 transmits the audio signal S51 to the play device.

On the other hand, in step S630, the current sensor 521 detects the audio parameter PT5 of the audio codec 511, i.e. the internal current of the audio codec 511, and accordingly generates a sensing current C51. It should be noticed that a magnitude of the internal current of the audio codec 511 relates to a magnitude of the voltage V51. In other words, the current sensor 521 can obtain the audio parameter PT5 by detecting the voltage V51, so that those skilled in the art can change a detection type of the current sensor 521 according to design requirements. Moreover, in step S640, the embedded controller 522 determines whether the play device is the inbuilt speaker 502 to determine whether the electronic device 500 is capable of sending sounds.

Moreover, in step S650, the embedded controller 522 further determines whether the audio parameter PT5 is greater than a threshold value for a predetermined time according to the sensing current C51. A unit of the threshold value is a current unit, which is, for example, amp or milli-amp. Therefore, when the play device is not the inbuilt speaker 502 or the audio parameter PT5 is not greater than the threshold value for the predetermined time, the embedded controller 522 uses the first temperature-controlled rotation speed table to generate the speed VR5 of fan rotation, and controls the rotation speed of the fan 530 according to the speed VR5 of fan rotation (step S660).

Conversely, when the play device is the inbuilt speaker 502 and the audio parameter PT5 is greater than the threshold value for the predetermined time, the embedded controller 522 uses the second temperature-controlled rotation speed table to generate the speed VR5 of fan rotation, and controls the rotation speed of the fan 530 according to the speed VR5 of fan rotation (step S670). Moreover, during a process of using the second temperature-controlled rotation speed table to control the fan 530, in step S680, the embedded controller 522 determines whether the audio parameter PT5 is smaller than the threshold for a predetermined time.

In this way, when the audio parameter PT5 is not smaller than the threshold for the predetermined time, it represents that the play device continually plays sounds, and now the next step is to return to step S640 to determine whether the sound output by the electronic device 500 can overshadow the noise of the fan 530. Conversely, when the audio parameter PT5 is smaller than the threshold value for the predetermined time, it represents that the play device stops playing sounds, so that the next step is to return to step S660 to use the first temperature-controlled rotation speed table to generate the speed VR5 of fan rotation. Detailed operations of various components of the electronic device 500 and descriptions of the flow of FIG. 6 are similar as that described in the aforementioned embodiment, which are not repeated herein.

In summary, in the invention, one of the first temperature-controlled rotation speed table and the second temperature-controlled rotation speed table is selected to control the rotation speed of the fan according to the type of the play device and the audio parameter. Moreover, under the same temperature, the predetermined rotation speed recorded in the first temperature-controlled rotation speed table is smaller than the predetermined rotation speed recorded in the second temperature-controlled rotation speed table. In this way, when the sound sent by the electronic device conceals the noise of the fan, the rotation speed of the fan is enhanced, so as to improve the operating performance of the electronic device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device, comprising:
an audio module, for generating an audio signal and an audio parameter according to audio data, and transmitting the audio signal to a play device, wherein the audio parameter is a variable value generated by the audio module corresponding to a volume of the play device, wherein the audio signal is a sound or a music and is not an ambient noise;
a monitoring module, wherein when the play device is not configured in the electronic device, the monitoring module determines a speed of fan rotation according to a sensed temperature, and when the play device is configured in the electronic device, the monitoring module determines the speed of fan rotation according to the sensed temperature and the audio parameter, wherein the sensed temperature is sensed within the electronic device; and
a fan, for adjusting a rotation speed thereof according to the determined speed of fan rotation.

2. The electronic device as claimed in claim 1, wherein the audio module comprises:
an audio codec, electrically connected to the play device, for converting the audio data into the audio signal according to a gain value, and transmitting the audio signal to the play device, wherein the audio codec generates the audio parameter according to the gain value and an amplitude value of the audio data, or generates the audio parameter according to an internal current.

3. The electronic device as claimed in claim 1, wherein a format of the audio data is a pulse coding modulation format.

4. The electronic device as claimed in claim 1, wherein the monitoring module captures or detects the audio parameter.

5. The electronic device as claimed in claim 1, wherein the monitoring module uses a first temperature-controlled rotation speed table or a second temperature-controlled rotation speed table to generate the speed of fan rotation.

6. The electronic device as claimed in claim 5, wherein the monitoring module comprises:
a control chip, for capturing the audio parameter;
a codec driver, for determining whether the audio parameter is greater than a threshold value, so as to determine whether or not to generate a switching signal; and
an embedded controller, for determining whether the play device is an inbuilt speaker and whether the switching signal lasts for a predetermined time, wherein when the play device is not the inbuilt speaker or the switching signal does not last for the predetermined time, the embedded controller uses the first temperature-controlled rotation speed table to generate the speed of fan rotation, and when the play device is the inbuilt speaker and the switching signal lasts for the predetermined time, the embedded controller uses the second temperature-controlled rotation speed table to generate the speed of fan rotation.

7. The electronic device as claimed in claim 6, wherein a unit of the threshold value is decibel.

8. The electronic device as claimed in claim 6, wherein the control chip is a platform controller hub.

9. The electronic device as claimed in claim 6, wherein when the embedded controller uses the second temperature-controlled rotation speed table to generate the speed of fan rotation, the embedded controller further determines whether the audio parameter is smaller than the threshold value for the predetermined time, so as to determine whether or not to continually use the second temperature-controlled rotation speed table to generate the speed of fan rotation.

10. The electronic device as claimed in claim 5, wherein the monitoring module comprises:
   a current sensor, for detecting the audio parameter; and
   an embedded controller, for determining whether the play device is an inbuilt speaker and determining whether the audio parameter is greater than a threshold value for a predetermined time, wherein when the play device is not the inbuilt speaker or the audio parameter is not greater than the threshold value for the predetermined time, the embedded controller uses the first temperature-controlled rotation speed table to generate the speed of fan rotation, and when the play device is the inbuilt speaker and the audio parameter is greater than the threshold value for the predetermined time, the embedded controller uses the second temperature-controlled rotation speed table to generate the speed of fan rotation.

11. The electronic device as claimed in claim 10, wherein a unit of the threshold value is a current unit.

12. The electronic device as claimed in claim 10, wherein when the embedded controller uses the second temperature-controlled rotation speed table to generate the speed of fan rotation, the embedded controller further determines whether the audio parameter is smaller than the threshold value for the predetermined time, so as to determine whether or not to continually use the second temperature-controlled rotation speed table to generate the speed of fan rotation.

13. The electronic device as claimed in claim 1, wherein the sensed temperature is the temperature of an electronic component in the electronic device or the internal temperature of the electronic device.

14. A fan control method, adapted to an electronic device comprising a fan and a play device, and the fan control method comprising:
   generating an audio signal and an audio parameter according to audio data;
   transmitting the audio signal to a play device, wherein the audio parameter is a variable value generated by the audio module corresponding to a volume of the play device, wherein the audio signal is a sound or a music and is not an ambient noise;
   determining a speed of fan rotation according to a sensed temperature when the play device is not configured in the electronic device, and determining the speed of fan rotation according to the sensed temperature and the audio parameter when the play device is configured in the electronic device, wherein the sensed temperature is sensed within the electronic device; and
   adjusting a rotation speed of the fan according to the determined speed of fan rotation.

15. The fan control method as claimed in claim 14, wherein the step of generating the audio signal and the audio parameter according to the audio data comprises:
   converting the audio data into the audio signal according to a gain value; and
   generating the audio parameter according to the gain value and an amplitude value of the audio data, or generating the audio parameter according to an internal current of the electronic device.

16. The fan control method as claimed in claim 14, wherein a format of the audio data is a pulse coding modulation format.

17. The fan control method as claimed in claim 14, further comprising:
   using a first temperature-controlled rotation speed table or a second temperature-controlled rotation speed table to generate the speed of fan rotation.

18. The fan control method as claimed in claim 17, wherein the step of determining the speed of fan rotation according to the sensed temperature when the play device is not configured in the electronic device, and determining the speed of fan rotation according to the sensed temperature and the audio parameter when the play device is configured in the electronic device comprises:
   determining whether the play device is an inbuilt speaker;
   determining whether the audio parameter is greater than a threshold value for a predetermined time when the play device is the inbuilt speaker;
   using the second temperature-controlled rotation speed table to generate the speed of fan rotation when the audio parameter is greater than the threshold value for the predetermined time; and
   using the first temperature-controlled rotation speed table to generate the speed of fan rotation when the play device is not the inbuilt speaker or the audio parameter is not greater than the threshold value for the predetermined time.

19. The fan control method as claimed in claim 18, further comprising:
   further determining whether the audio parameter is smaller than the threshold value for the predetermined time when using the second temperature-controlled rotation speed table to generate the speed of fan rotation;
   returning to the step of using the first temperature-controlled rotation speed table to generate the speed of fan rotation when the audio parameter is smaller than the threshold value for the predetermined time; and
   returning to the step of determining whether the play device is the inbuilt speaker when the audio parameter is not smaller than the threshold value for the predetermined time.

20. The fan control method as claimed in claim 14, further comprising:
   capturing or detecting the audio parameter.

* * * * *